(12) United States Patent
Orr

(10) Patent No.: US 7,913,457 B1
(45) Date of Patent: Mar. 29, 2011

(54) ASSET PROTECTION METHOD AND APPARATUS

(76) Inventor: James R. Orr, Davenport, IA (US)

( * ) Notice: Subject to any disclaimer, the term of this patent is extended or adjusted under 35 U.S.C. 154(b) by 0 days.

(21) Appl. No.: 12/716,039

(22) Filed: Mar. 2, 2010

Related U.S. Application Data

(63) Continuation of application No. 11/821,196, filed on Jun. 21, 2007, now abandoned, which is a continuation-in-part of application No. 11/108,595, filed on Apr. 18, 2005, now abandoned.

(51) Int. Cl.
*E04B 1/34* (2006.01)
*E04G 11/04* (2006.01)
*E04H 15/20* (2006.01)

(52) U.S. Cl. .................. 52/2.23; 52/2.22; 52/3

(58) Field of Classification Search .............. 244/134 A; 52/1, 2.11, 2.22, 2.23, 2.25, 3; 296/136.02
See application file for complete search history.

(56) References Cited

U.S. PATENT DOCUMENTS

| | | | | | |
|---|---|---|---|---|---|
| 2,237,175 | A | * | 4/1941 | Colley | 244/134 A |
| 2,327,034 | A | * | 8/1943 | Geer | 244/134 A |
| 2,741,692 | A | * | 4/1956 | Luke | 219/528 |
| 5,248,116 | A | * | 9/1993 | Rauckhorst | 244/134 A |
| 5,337,978 | A | * | 8/1994 | Fahrner et al. | 244/134 A |
| 5,746,027 | A | * | 5/1998 | Bonerb | 52/1 |
| 6,108,980 | A | * | 8/2000 | Braun | 52/2.16 |
| 6,668,491 | B1 | * | 12/2003 | Bonerb | 52/1 |

* cited by examiner

*Primary Examiner* — Basil Katcheves
*Assistant Examiner* — Andrew J Triggs
(74) *Attorney, Agent, or Firm* — Hamilton IP Law, PC.; Jay R. Hamilton; Charles A. Damschen

(57) ABSTRACT

An asset protection apparatus comprising at least one module is disclosed. A module comprises at least one interior layer contacting an asset surface; at least one thermal layer affixed to said at least one interior layer, wherein said at least one thermal layer includes heat adding and heat removal means capable of removing or adding heat to said asset surface or a substance adjacent said at least one thermal layer; and at least one exterior layer affixed to said at least one thermal layer, wherein said at least one exterior layer is constructed of a material or plurality of materials that alone or in combination are resistant to degradation from exposure to outdoor elements, wherein said apparatus is cooperatively secured to said asset surface.

8 Claims, 8 Drawing Sheets

ASSET PROTECTION METHOD AND APPARATUS

CROSS REFERENCE TO RELATED APPLICATIONS

The present application claims priority from and is a continuation of U.S. patent application Ser. No. 11/821,196 filed on Jun. 21, 2007, now abandoned which claimed priority from and was a continuation-in-part of U.S. Pat. App. 11/108, 595 filed on Apr. 18, 2005, now abandoned both of which are incorporated by reference herein in their entireties.

FIELD OF THE INVENTION

The present invention relates to methods and apparatuses to cover and protect assets, including aircraft, motor vehicles, marine vehicles, and stationary assets. The method and apparatus eliminates many safety and environmental hazards associated with aircraft, marine vehicles, and motor vehicles parked or tied down and exposed to the elements, pests, and intruders. The asset protection apparatus described herein may be attached to a ground surface for protection of stationary assets and articles under the apparatus, or it may be attached to only the asset itself.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

BACKGROUND OF THE INVENTION

This invention provides the ability to maintain and protect the structural integrity of an asset, such as a ground or marine vehicle or an aircraft, and increases the safety margins for the safe operation of a vehicle that has been stored outside for any duration of time. The asset protection apparatus also helps to maintain and protect the structural integrity of stationary assets, such as generators.

Many vehicles, including aircraft, are expensive and vulnerable to deterioration and/or damage from exposure to the elements and destructive weather phenomena. Vehicles stored outdoors are exposed to at least four separate and distinct weather concerns that may cause instant damage or long-term deterioration to the vehicle. Exposure to the elements without protection may lead to at least one of the following: (1) an increase the risk of unsafe operation; (2) damage to the vehicle and its components; (3) reduction in the value of the vehicle; and, (4) contamination of the fuel supply.

The exterior and interior of an aircraft are constructed of materials susceptible to deterioration and damage from various environmental elements such as sunlight, heat, thunderstorms, hail, rain, bird and animal nesting and droppings, freezing rain, frost, ice, snow, industrial hazards and pollutants, environmental hazards and pollutants, vandalism, and extreme cold. Valuable assets such as aircraft, land and marine vehicles, and stationary assets are also susceptible to terrorist attacks, confiscation, or theft.

Ultraviolet ("UV") rays from the sun damage paint surfaces, glass, Plexiglas, and exterior appendages such as antennas, lights, and lenses. An unprotected vehicle exposed to UV rays for any period of time will experience subtle but expensive UV deterioration, which reduces the vehicle's value. The same result may occur with stationary assets exposed to UV rays.

The constant thermal change caused by the heating and cooling during the normal daily, weekly, and/or yearly temperature variations that is subsequently imparted to the metal, composite material, carbon fiber, paint, or other material introduces stress to the exterior of the vehicle or stationary asset, fades the paint, and reduces the integrity and life of the asset. Thermal changes may cause expensive deterioration and damage to any asset, whether vehicles or stationary assets. For example, an aircraft exposed to sunlight, without ventilation, will experience dramatic increased temperatures inside the aircraft, which temperatures sometimes exceed 150 degrees Fahrenheit. This extreme heat may damage and/or reduce the functional life of the avionics and other equipment, cause the interior to fade, and reduce the value of the aircraft. The negative consequences of exposure to heat are amplified with simultaneous exposure to sunlight, which may also shorten the life of the sophisticated and expensive navigational equipment and fade the interior of any vehicle left unprotected due to the UV rays. The UV and thermal damage to vehicles or stationary assets may be dramatic and expensive to repair.

Unprotected assets are also subject to damage and deterioration from thunderstorms and hailstorms. Specifically, the exterior of an aircraft is typically constructed with materials that are lightweight, such as aluminum, which may be less durable than other materials when subjected to the impact of hailstones or other stimuli during thunderstorms. Thunderstorms are unpredictable and may culminate in a short time, and the damage a thunderstorm or hailstorm may inflict upon an asset may damage it beyond repair in a matter of moments. Many times hail damage renders aircraft unsafe for flight and/or greatly reduces the value of the aircraft. Furthermore, hailstorm damage to an aircraft changes the aerodynamics of the aircraft. Hail dimples on the fuselage, wings (particularly the leading edges), and the horizontal and vertical stabilizers often changes the lift and stall characteristics for that particular aircraft. These changes in the aerodynamics of the aircraft alter its dynamic handling characteristics, which makes the aircraft operate outside the envelope of the pilot's operating handbook. This situation is unsafe and introduces numerous opportunities for accident, injury, and death. Also, thunderstorms and hailstorms may damage the windscreen, radar dome, radar unit, antennas, and other appendages that are necessary for safe flight. The cost of repair or replacement is extremely expensive, and until the aircraft is repaired, it must be removed from service. Similar damage may occur to other vehicles or stationary assets stored outdoors when subjected to hailstorms or thunderstorms.

Exposure to precipitation increases the possibility of rain water leaking past the fuel filler caps and migrating into the fuel tanks. Rain water contamination of the fuel tanks is a serious and persistent problem that may result in catastrophic failure of engine components.

Animal nests and bird droppings not expediently removed may cause deterioration of painted surfaces and corrosion of the structural elements of the asset, and may restrict the proper movement of the controls and control surfaces of vehicles. Nesting materials also pose a fire hazard as the material is often flammable.

Freezing rain, frost, ice, and snow are also detrimental to many assets. For example, flying an aircraft with freezing rain, frost, ice, or snow on the wings, fuselage, or the horizontal and vertical stabilizers is contrary to federal regulations and may result in injury or death due to an accident. Freezing rain, frost, ice, or snow on the aircraft surface changes the lift and stall characteristics for that particular aircraft. These changes alter the dynamic handling characteristics of the aircraft, which makes the aircraft operate outside the envelope of the pilot's operating handbook. Operating outside the limitations established by the pilot's operating handbook is unsafe and introduces numerous opportunities for accident, injury, and death. Freezing rain, frost, ice, or snow on the aircraft may restrict the aircraft from generating the necessary lift required to take off and maintain altitude. The pilot may remove as much of the freezing rain, frost, ice, or snow as the pilot is able to and then depart with some of the precipitation remaining on the aircraft. It is costly and time consuming to remove the freezing rain, frost, ice, or snow from the aircraft. The most conventional methods for removing the freezing rain, frost, ice, or snow from an aircraft include: (1) towing the aircraft to a heated building; (2) deluging the wings and tail section with a deicer, which is a hazardous material; or, (3) allowing the sun's heat to remove the substance. However, if the aircraft is towed into a heated building or left in the sun to melt the substance, unless all the water is removed, it may refreeze at altitude, which could render the controls inoperable.

Besides causing dangerous flight conditions, heavy snow loads on the wings or fuselage of an aircraft may cause structural damage to the aircraft. Also, extreme cold weather may render the control cables and moving parts, which affect the control surfaces, rigid and difficult to move, introducing excessive wear and the possibility for damage to the control mechanisms of the aircraft.

Other environmental hazards and pollutants also pose a threat to assets, such as volcanic ash, volcanic debris, and acid rain. These environmental hazards may completely destroy the asset or greatly reduce its value or functionality. Industrial hazards and pollutants, such as waste oil and radiation, have similar negative effects on assets. Vandalism also poses a continuing threat to the structural integrity and value of assets.

Currently, canvas covers are available that lay over windows and are attached to the outside of smaller aircraft to restrict the sun from entering the cockpit. This application appears to be marginally effective at best. Other vendors sell custom-fit, reflective material that is installed on the interior window surface of an aircraft. This reflective material must be cut to the specific size of the window and installed by pressing the reflective material for that particular window into the area around the window on the inside of the aircraft. This method is used with smaller aircraft. Because the reflective material is on the inside of the window, a great deal of heat may build up between the reflective material and the inside of the window, causing great stress to the window and reducing its life.

No product addresses the safety and protection of assets exposed to the elements of sunlight, heat, thunderstorms, hail, rain, fuel contamination, bird and animal nesting and droppings, freezing rain, frost, ice, snow, environmental hazards and pollutants, industrial hazards and pollutants, vandalism, terrorism, and extreme cold conditions. The asset protection method and apparatus will eliminate the damage and safety concerns associated with exposure of the asset to all of the above-identified elements.

BRIEF SUMMARY OF THE INVENTION

The asset protection apparatus may take one of many embodiments depending on the particular application. The orientation of the different layers, what layers are employed in any one embodiment, and the number of each layer employed in a specific embodiment are all determined by the application to which the apparatus is put.

One layer that may be employed in the apparatus is an inflatable layer, which consists of at least one inflatable cell, which may be mechanically secured to, and in fluid communication with, another inflatable cell to form an entire layer of inflatable cells.

Another layer that may be employed in the apparatus is a thermal layer capable of either heating or cooling structures adjacent to the thermal layer. The heating and cooling means used in the thermal layer will depend on the application of the apparatus, and include any means known to those skilled in the art. In addition, the thermal layer may serve as an insulating layer in many applications.

An interior layer may also be employed in the apparatus. The interior layer is typically composed of a non-abrasive material and is in contact with the surface of the asset. The interior layer may also be composed of material that is non-static generating when in contact with the asset surface.

An exterior layer may be employed wherein the exterior layer forms the outermost surface of the apparatus. The exterior layer may consist of several different materials to achieve the functional characteristics the user desires. For example, the exterior layer may be made a material that is water resistant, UV reflective, radiation resistant, heat resistant, abrasion resistant, and oil resistant. The exterior layer may also be impermeable to a certain range of wavelengths of electromagnetic waves, such as radio frequency waves or micro waves. However, if no one material possesses all the properties the user desires, several different materials may be secured together and oriented to achieve the characteristics the user desires, thereby creating an exterior layer that possesses all the characteristics needed. In many applications the material in the exterior layer should be sufficiently flexible to allow for easy installation and removal of the apparatus, and sufficiently durable and strong to resist damage and/or penetration from hailstones, volcanic debris, or other elements that could damage the asset. In applications where the apparatus is form fitted to a specific asset or in applications where the apparatus is fashioned as a blanket for protecting stationary assets, the exterior layer does not need to be flexible.

The different layers described above, when selected according to the needs of the user and secured together in the orientation and number appropriate for the particular application, comprise an individual module. Individual modules may be secured to other modules so that the inflatable layer, interior layer, exterior layer, and/or thermal layer from one module communicate with the respective layer of another module. Individual modules may be sized and shaped to fit specific assets, and, depending on the particular application, the apparatus may be fabricated to protect the asset from all the possible damaging elements previously identified.

The particular layers and/or modules of any one embodiment may be secured to other respective layers and/or modules so that the different layers and/or modules may be easily separated for other layers and/or modules. This ensures that one layer of a module may be removed and/or repaired without the need to replace or discard the other layers comprising that module; and it also ensures that one module of the asset protection apparatus may be repaired or replaced without the need to replace or discard the other layers. Alternatively, in a different embodiment, the layers may be laminated together so they may not be separated, thereby requiring the replacement of all layers of a particular module if one layer should fail.

The asset protection apparatus may also include several different security and/or monitoring means. For example, in one embodiment of a security means, a plurality of cameras may be mounted on the asset protection apparatus so that a person or automated system may monitor the asset and conditions existing around the asset. The cameras may be equipped with a tamper alarm that provides an appropriate alert if the conditions around the asset change in a detrimental way and/or if one of the cameras is tampered with. The security and/or monitoring means may either be controlled on site or from a remote location through a laptop computer, personal digital assistant, or other means know to those skilled in the art.

DETAILED DESCRIPTION

DETAILED DESCRIPTION

Listing of Elements

| Element Description | Element Number |
| --- | --- |
| Aircraft | 1 |
| Asset Protection Apparatus | 2 |
| Exterior Layer | 3 |
| Inflatable Cell | 4 |
| Inflatable Layer | 5 |
| Thermal Layer | 6 |
| Interior Layer | 7 |
| Asset Surface | 8 |
| Accumulated Snow | 9 |
| Falling Snow | 10 |
| Accumulated Substance | 12 |
| Inflated Inflatable Layer | 13 |
| Inflatable Layer During Inflation | 14 |
| Fragmented Accumulated Substance | 15 |
| Projectile | 16 |
| Sun | 18 |
| Solar Collector | 19 |
| Radiation Blocking Material | 20 |
| UV Blocking Material | 21 |
| Water Resistant Material | 22 |
| Pollutant Blocking Material | 23 |
| Camera | 24 |

DETAILED DESCRIPTION OF INVENTION

The general purpose of the present invention, which will be described subsequently in greater detail, is to provide a method and apparatus for protecting assets, including but not limited to aircraft, marine and land vehicles, and stationary assets, from common elements associated with outdoor storage or deployment.

Figure 1:
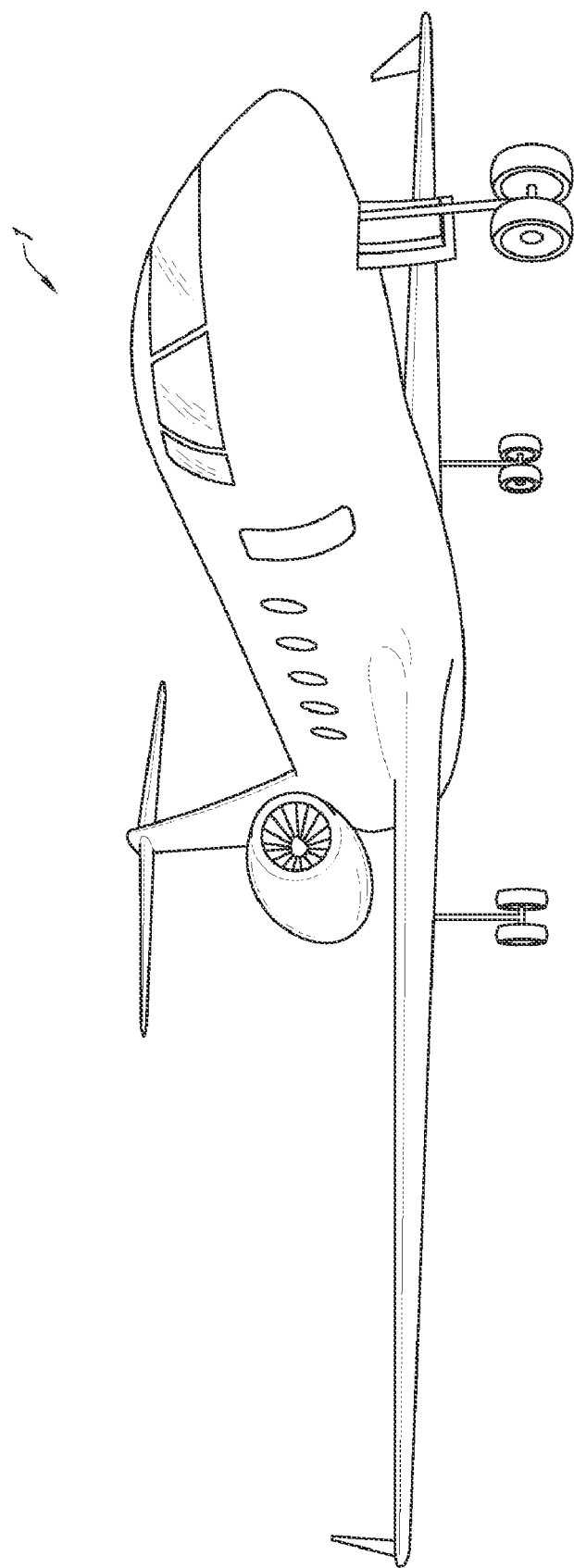
FIG. 1 provides a perspective view of an aircraft on which the asset protection apparatus may be installed.
Figure 2:
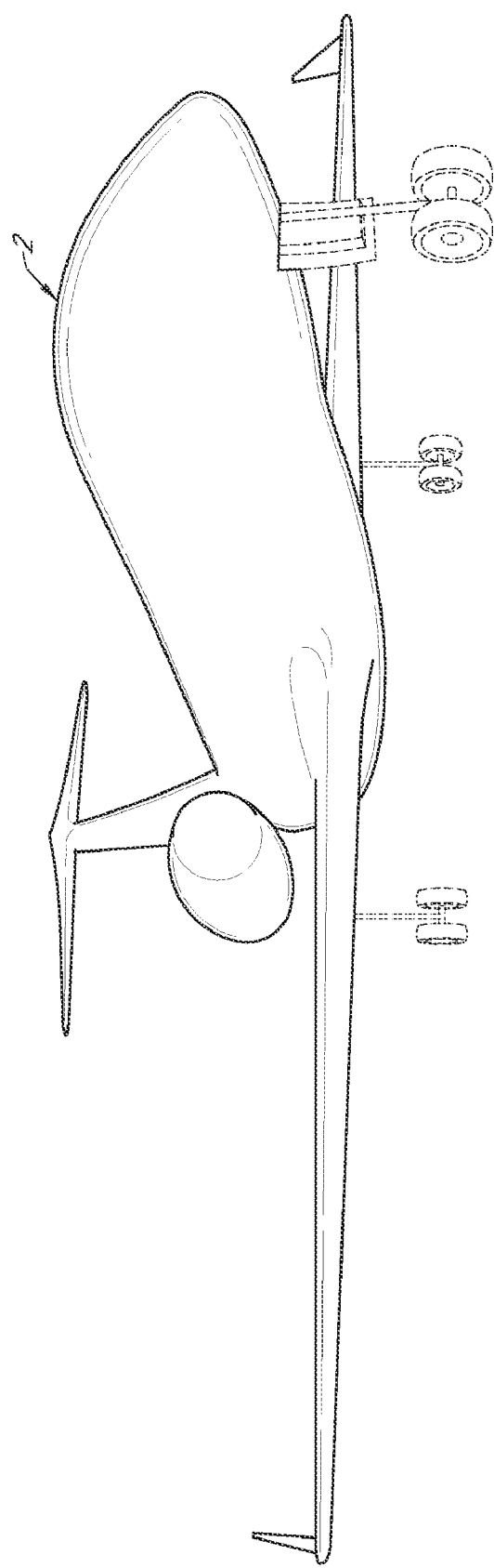
FIG. 2 provides a perspective view of the aircraft from FIG. 1 with the asset protection apparatus installed.

Referring now to the drawings, wherein like reference numerals designate identical or corresponding parts throughout the several views, FIG. 1 shows an aircraft 1 to which the asset protection apparatus 2 may be applied. The asset protection apparatus 2 may be composed of a plurality of individual modules, and those individual modules may then be joined together to form a complete asset protection apparatus 2. For example, an asset protection apparatus 2 designed to be installed on the aircraft 1 shown in FIG. 1 may consist of a module for each wing, a module for the fuselage, a module for each engine, and a module for the tail section, or any combination thereof. These individual modules may be secured to one another and then secured to the asset surface 8 to form a complete covering for the asset surface 8, or the individual modules may be individually secured to the asset surface 8. The entire asset protection apparatus 2 or individual modules thereof may be secured to the asset surface 8 by any means known to those skilled in the art, as recited in the claims, including but not limited to straps, mechanical loops and hooks, staples, magnets, laces, screws, bolts, chemical adhesives, mechanical welds, rivets, and the like. Alternatively, individual modules may be molded so that the module maintains a tight fit with the asset surface 8 so that no additional securing means are required.

In another embodiment, the asset protection apparatus 2 may be fashioned in a substantially flat shape, similar to a blanket, to be adapted for use over assets of varying shape and size. In this embodiment, it may be desirable to secure the asset protection apparatus 2 to the ground or the surface on which the asset protection apparatus 2 rests. This may be done by any means known to those skilled in the art, including but not limited to ropes with stakes, weights, embedded tie-down hooks, and the like.

The asset protection apparatus 2 may be composed of several different layers in different orientations, depending on the specific embodiment. In the embodiment shown in FIG. 3, the asset protection apparatus consists of a exterior layer 3, two inflatable layers 5 (both of which are depicted in the deflated state in FIG. 3), a thermal layer 6, and a interior layer 7. The exterior layer 3 in this embodiment consists of a UV blocking material 21 and a water resistant material 22. Each layer is secured to the adjacent layer or layers by means known to those skilled in the art, including but not limited to mechanical loops and hooks, threaded seams, chemical adhesives, magnets, screws, bolts, and the like. The asset protection apparatus 2 may be fashioned so that the several layers may be individually replaced or repaired without the need to replace the entire asset protection apparatus. Furthermore, the layers of one module may be in communication with the same respective layers of other modules. That is, the inflatable layer 5 of one module may be in fluid communication with the inflatable layer 5 of another module, so that inflating or deflating the inflatable layer 5 of one module inflates or deflates the inflatable layer 5 of other modules; and the thermal layer 6 of one module may be in thermal communication with the thermal layer 6 of another module so that heating or cooling the thermal layer 6 in one module heats or cools the thermal layer 6 of another module. Respective interior layers 7 and exterior layers 3 of different modules may be in communication in a similar manner.

The interior layer 7 is in direct contact with the asset surface 8, and may be fashioned of a material that is anti-static and non-abrasive to protect the asset surface 8. The interior layer 7 may employ a material capable of absorbing the force of an impact, such as a polyurethane foam, connected to the non-abrasive, anti-static material. The interior layer 7 may also be comprised of materials that allow it to serve as an insulating layer, either to prevent heat flow from the asset or to prevent heat flow to the asset.

Figure 4:
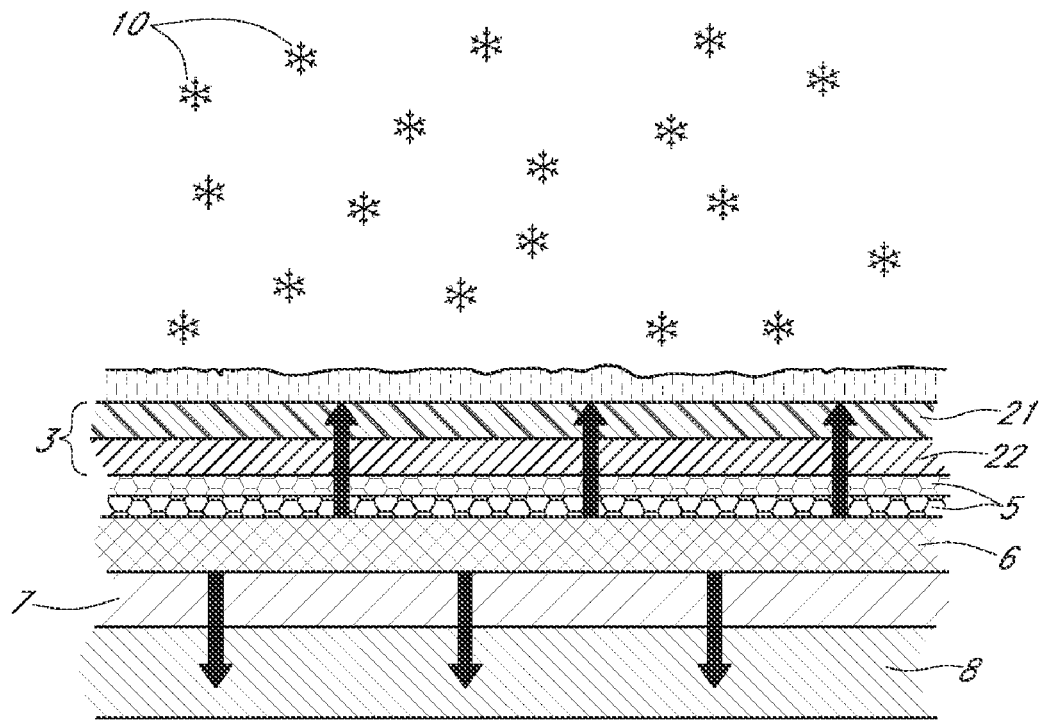
FIG. 4 provides a second cut-away side view of the first embodiment of the asset protection apparatus with the inflatable layer deflated, the thermal layer heating adjacent layers, and snow accumulated on the exterior layer.
Figure 10:
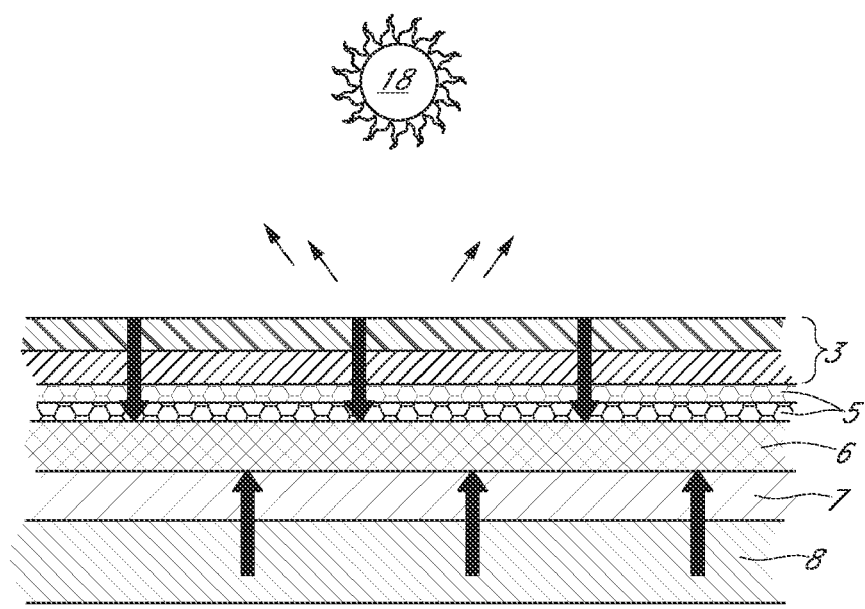
FIG. 10 provides a cut-away side view of the first embodiment of the asset protection apparatus and shows the reflection of UV rays by the exterior layer and the thermal layer cooling adjacent surfaces.

The thermal layer 6 is comprised of either heating elements, cooling elements, or heating and cooling elements, depending on the specific embodiment. If the thermal layer 6 is composed of only heating elements, it has the capacity to add heat to adjacent layers (which in turn add heat to other adjacent substances), and if it is composed of only cooling elements, it has the capacity to remove heat from adjacent layers (which in turn remove heat from other adjacent substances). If the thermal layer 6 contains both heating and cooling elements, it is capable of both adding and removing heat from adjacent layers. Any means known to those skilled in the art may be used for heating or cooling, including but not limited to circulating fluid, electric elements, solar cells, or chemical cells. As shown in FIG. 4, the thermal layer may be used to add heat to adjacent layers of the asset protection apparatus 2 to melt accumulated snow 9, ice, sleet, or other forms of frozen precipitation that has accumulated on the exterior layer 3. The arrows in FIG. 4 indicate the direction of heat flow from the thermal layer 6 during heating. The thermal layer 6 may also be used to add heat to the asset surface 8 to eliminate the negative effects of extreme cold identified above. During periods of extreme heat, the thermal layer 6 may be used to remove heat from the asset surface 8 to eliminate the negative effects of extreme heat identified above. FIG. 10 depicts the asset protection apparatus 2 when the thermal layer 6 is operating to remove heat from the asset surface 8 and surfaces adjacent the thermal layer 6. The arrows in FIG. 10 indicate the flow of heat to the thermal layer 6. Additionally, the thermal layer 6 may serve as an insulating layer even if the heat adding/removing means are not engaged.

The inflatable layer 5 is composed of a plurality of individual inflatable cells 4 that are mechanically and fluidly connected to other inflatable cells 4 in a module. The inflatable layer 5 is fashioned to be hermetically sealed so that it may be inflated with a suitable fluid (and remain inflated for a period of time), such as air, nitrogen, argon, or any other fluid know to those skilled in the art, and then subsequently deflated. The material used to construct the individual inflatable cells 4 may be any material impermeable to the inflating fluid used for that particular application. For example, if the inflating fluid is air, the inflatable cells 4 are constructed of a material impermeable to air, such as rubber. When the inflatable layer 5 is inflated, as depicted in FIGS. 5-8, it expands and increases to a thickness determined by the volume of fluid used to inflate the inflatable layer 5 and the design characteristics of the module for the specific application. Inflatable layers 5 of individual modules of one asset protection apparatus may be fluidly connected and/or mechanically connected together so that inflation and/or deflation of one module deflates and/or inflates other modules.

Figure 8:
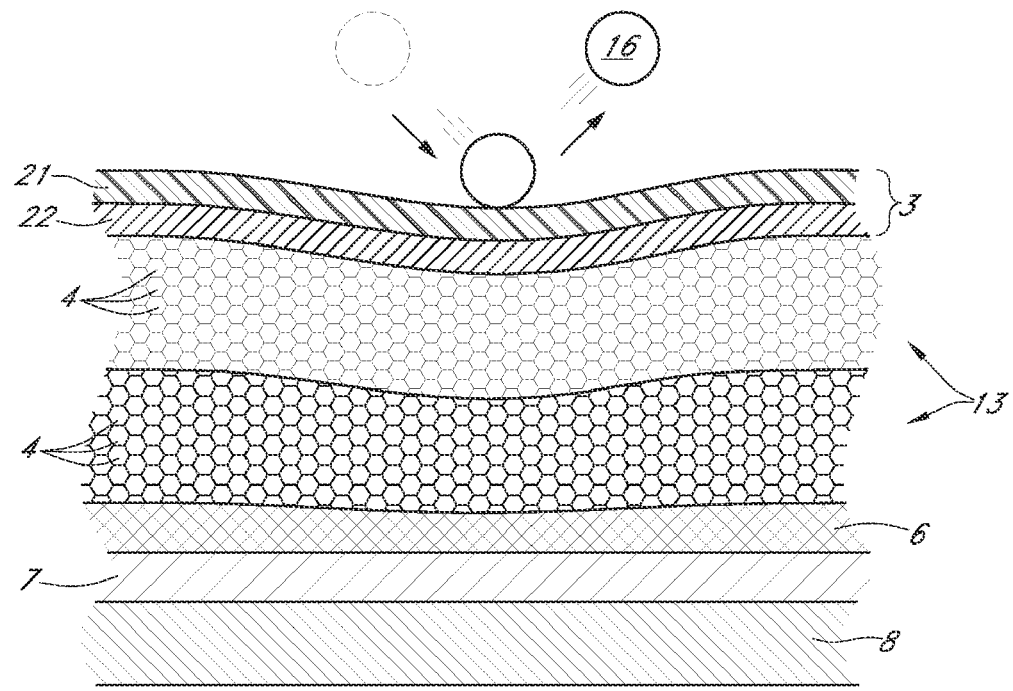
FIG. 8 provides a cut-away side view of the first embodiment of the asset protection apparatus with two inflatable layers inflated and shows how the asset protection apparatus protects the asset from debris and projectiles.
Figure 9:
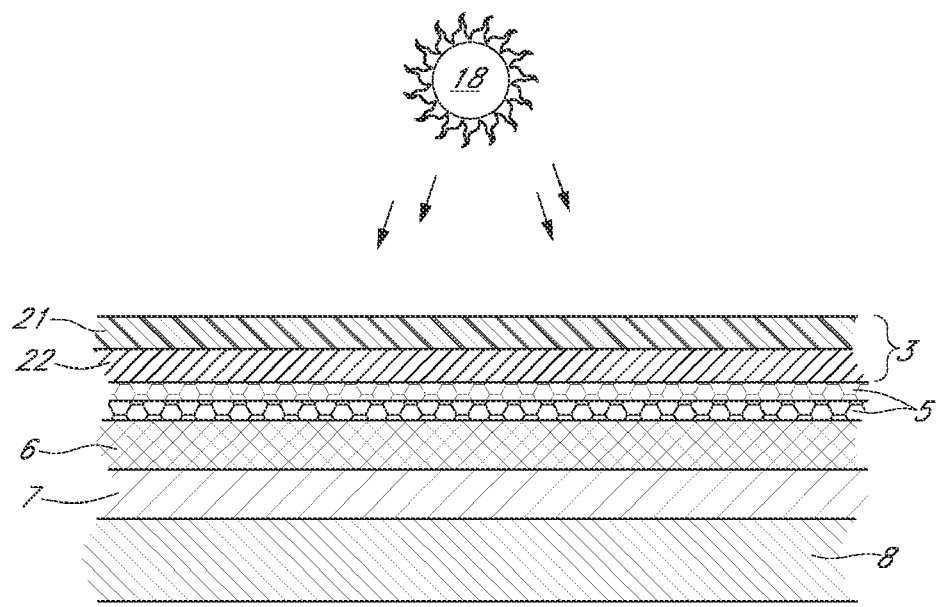
FIG. 9 provides a cut-away side view of the first embodiment of the asset protection apparatus and shows the reflection of UV rays by the exterior layer.

When inflated, the inflatable layer 5 acts as a cushion for debris or other projectiles 16, such as rocks or hailstones, as is depicted in FIG. 8. The arrows in FIG. 8 indicate the trajectory a projectile 16 would travel during approach, impact with the exterior layer 3, and subsequent reflection.

Figure 3:
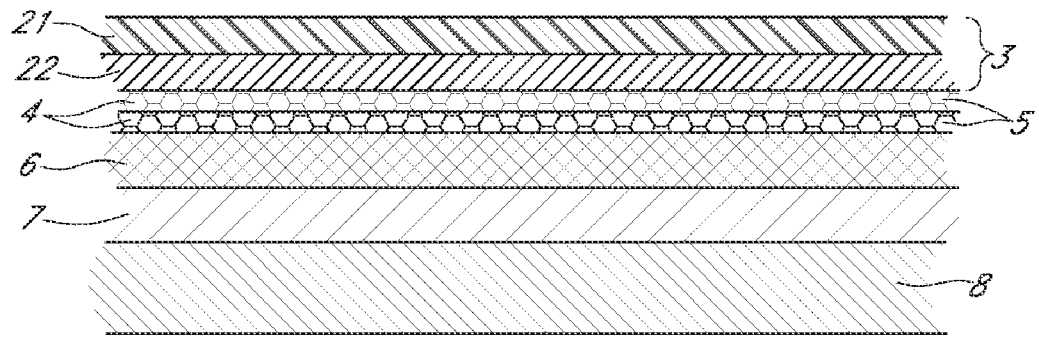
FIG. 3 provides a cut-away side view of a first embodiment of the asset protection apparatus with the inflatable layer deflated.
Figure 5:
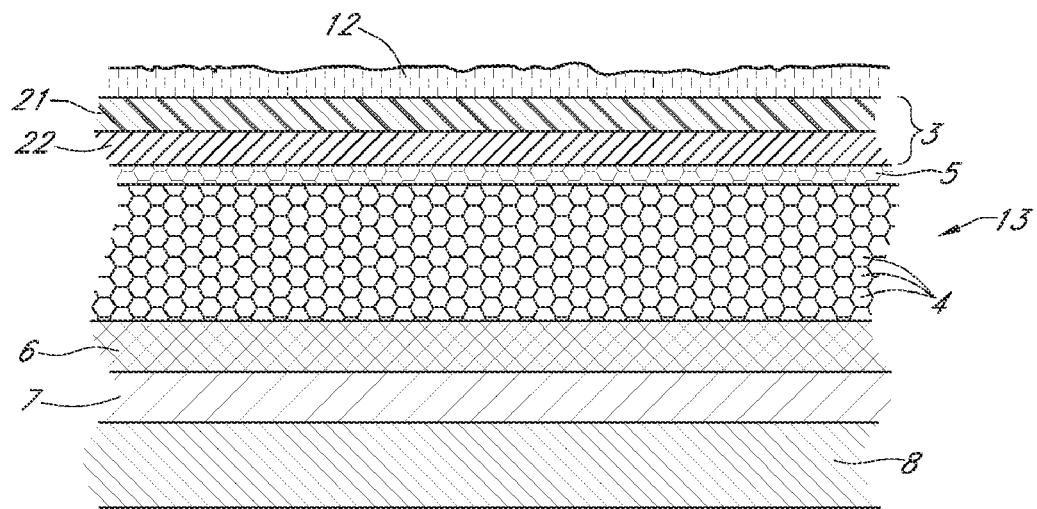
FIG. 5 provides a cut-away side view of the first embodiment of the asset protection apparatus with one inflatable layer inflated, a second inflatable layer deflated, and a substance accumulated on the exterior layer.
Figure 6:
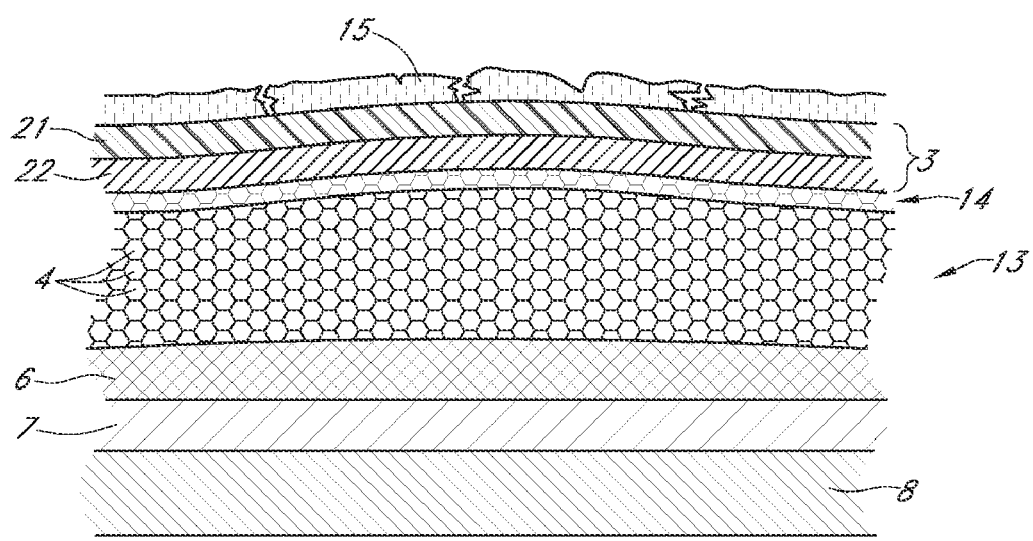
FIG. 6 provides a cut-away side view of the first embodiment of the asset protection apparatus with one inflatable layer inflated, a second inflatable layer in the process of inflation, and a substance accumulated on the exterior layer being removed from the inflation of the second inflatable layer.
Figure 7:
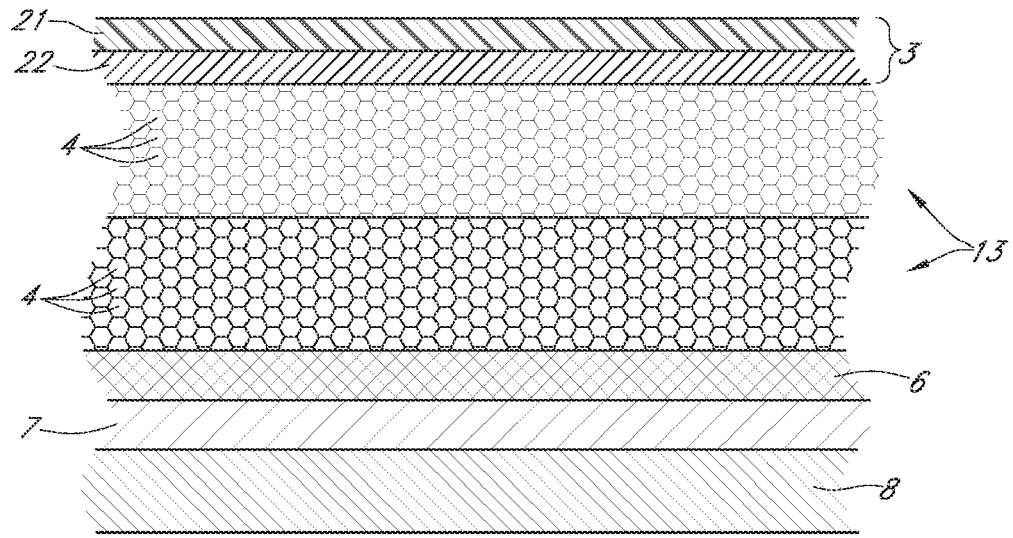
FIG. 7 provides a cut-away side view of the first embodiment of the asset protection apparatus with two inflatable layers inflated.

The inflatable layer 5 may be used to dislodge an accumulated substance 12 from the exterior layer 3. FIG. 3 shows falling snow 10 and subsequent accumulated snow 9 on the exterior layer 3 of the asset protection apparatus 2. This method disclosed for removing accumulated snow 9 from the exterior layer 3 also may be used to remove ice, volcanic ash, or any other accumulated substance 12 that might accumulated on the exterior layer 3. If at least one inflatable layer 5 is deflated when a substance has accumulated on the exterior layer 3, the inflatable layer 5 may be inflated to dislodge the accumulated substance 12. FIG. 5 shows the asset protection apparatus 2 with an accumulated substance 12 on the exterior layer 3, and the asset protection apparatus 2 having one inflated inflatable layer 13 and one deflated inflatable layer 5. FIG. 6 shows the accumulated substance 12 being dislodged as the deflated inflatable layer 5 is inflated. In FIG. 6, the inflatable layer during inflation 14 expands and dislodges the accumulated substance 12, changing the accumulated substance 12 to a fragmented accumulated substance 15, allowing much of the accumulated substance 12 to be removed by gravity.

Inclusion of two inflatable layers 5 is especially desirable in climates that are likely to experience freezing rain changing to hail, or hail changing to freezing rain. With two inflatable layers 5, one inflatable layer 5 may remain deflated and one may remain inflated. The inflated inflatable layer 13 will act as a cushion for any hailstones or other projectiles impacting the exterior layer 3, and the deflated inflatable layer 5 may be used to dislodge any accumulated substance 12 by inflating the deflated inflatable layer 5.

Figure 11:
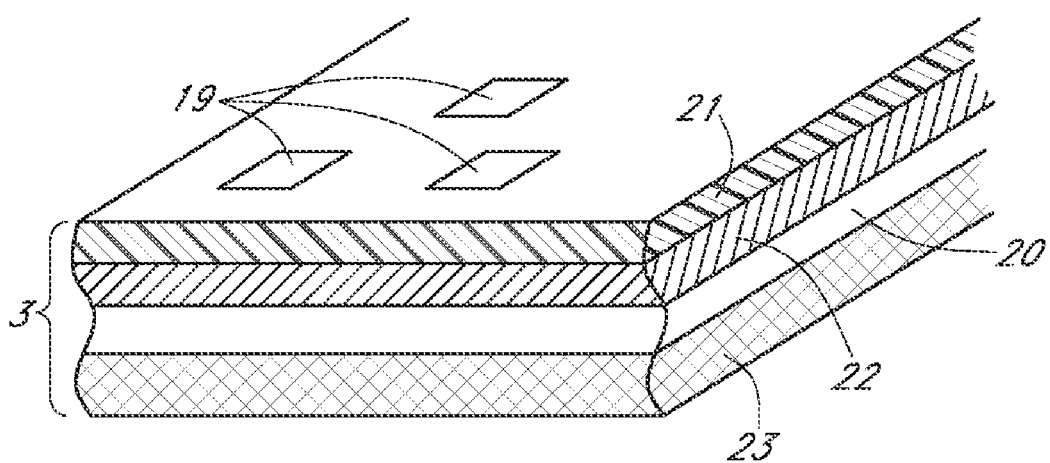
FIG. 11 provides a cut-away perspective view of another embodiment of the asset protection apparatus and shows the exterior layer comprised of a plurality of different materials having different functions.

The materials composing the exterior layer 3 are dictated by the application to which the asset protection apparatus will be put. The material may be abrasion resistant, such as a ballistic nylon, coupled with a UV blocking material 21 (such as a metallic foil), water resistant material 22 (such as rubber or an appropriate polymeric material), radiation blocking material 20 (such as lead), a material that protects the asset surface 8 from various specific industrial pollutants (such as propylene glycol, used oil, etc.), and/or a material that protects the asset surface 8 from various specific environmental pollutants (such as acid rain, volcanic ash, etc.). FIG. 11 shows an embodiment of the asset protection apparatus 2 wherein the exterior layer 3 is comprised of a plurality of functional materials, including a UV blocking material 21, a water resistant material 22, a radiation blocking material 20, and a pollutant blocking material 23. Contemplated industrial pollutants/hazards include organic compounds (such as various hydrocarbons), inorganic compounds (such as salts and acidic or basic compounds), or other pollutants/hazards that may, or are likely to, damage the asset surface 8 of an asset placed in proximity to any industrial process. The exterior layer 3 may also include a material that blocks electromagnetic waves in a certain range of wavelengths and frequencies, such as radio waves or micro waves. In many applications, the exterior layer 3 should be flexible enough not to interfere with installation or removal of the asset protection apparatus 2 and to allow for expansion during the inflation of the inflatable layer 5. However, in alternative embodiments, often in applications where the asset protection apparatus 2 is fashioned to protect a stationary asset or formed to fit a specific vehicle, the exterior layer 3 need not be flexible, as the specific application may require additional radiation blocking material 20, which may reduce flexibility. Alterations and variations to the several types of materials and the associated combinations thereof disclosed and described herein will occur to those skilled in the art without departing from the spirit and scope of the present invention.

In another embodiment, the exterior layer 3 may also be comprised of a material that contains solar collectors 19 on a portion of the surface area of the exterior layer 3, as shown in FIG. 11. The solar collectors 19 may have the capacity to convert solar energy into electricity, thereby providing a supplemental power source. The electricity provided by the solar collectors 19 may be used to power a blower in communication with the inflatable layer 5 to decrease the utility costs associated with inflating, deflating, or maintaining a certain pressure with the inflatable layer 5. Alternatively, the electricity provided by the solar collectors 19 may be used to offset utility costs associated with the thermal layer 6; or it may be used to offset the utility costs associated with both the thermal layer 6 and the inflatable layer 6. The electricity from the solar collectors 19 could also be used to power a device external to the asset protection apparatus 2, such as a charging a battery or powering an external lighting system. In still another embodiment, a source selector in communication with the electricity from the solar collectors 19 could be used to direct the electricity from the solar collectors 19 to any and/or all the possible destinations listed above. The solar collectors 19 may be used in conjunction with any other materials contemplated for the exterior layer 3, and the specific types of materials chosen for the functionalities contemplated hereby, or the orientation and placement thereof in no way limits the scope of the present invention. Furthermore, the solar collectors 19 may be shaped differently than those shown in FIG. 11, or they may be integrated into the entire fabric of the exterior layer 3.

Figure 12:
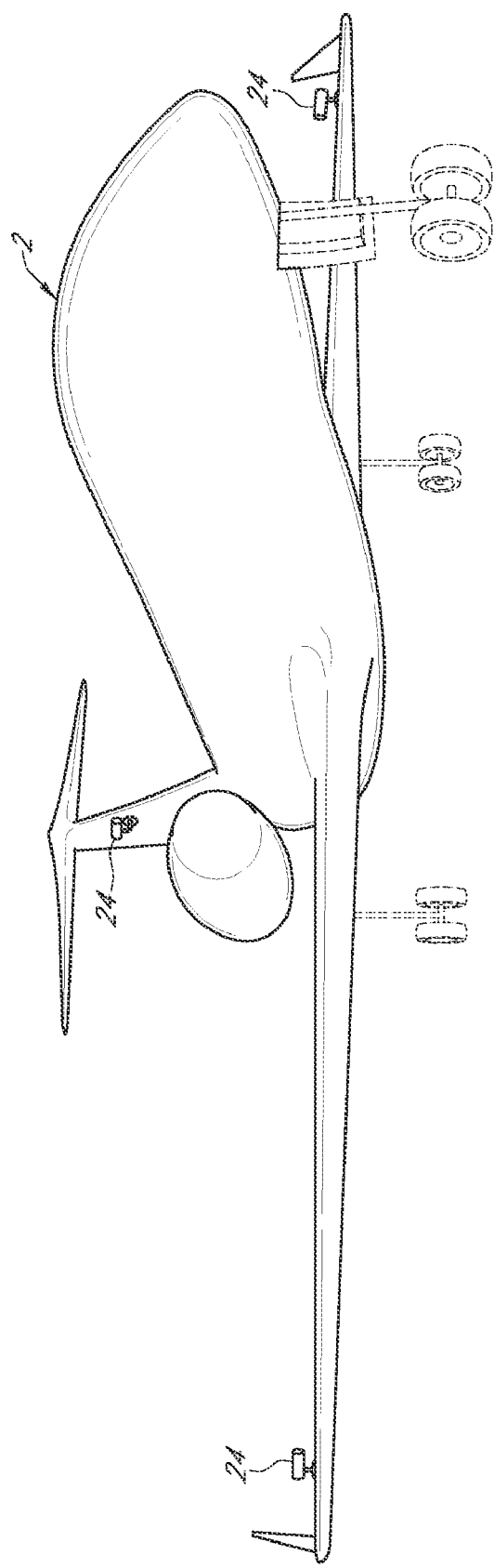
FIG. 12 provides a perspective view of the aircraft from FIG. 1 with the asset protection apparatus equipped with a plurality of cameras installed.

Different monitoring methods may be employed with the asset protection apparatus 2. For example, a pressure indicator may be installed to communicate with the inflatable layer 5 to alert the user if the pressure within the inflatable layer 5 falls below a certain value. Alternatively, the pressure indicator could be coupled to a fluid pump that would automatically engage and add fluid to the inflatable layer 5 if the pressure within the inflatable layer 5 decreased to a predetermined value. Monitors may also be installed to ensure no person tampers with the asset protection apparatus 2, such as motion detectors, cameras 24, and alarms, which would help to prevent vandalism, terrorism, and theft. FIG. 12 shows an asset protection apparatus 1 equipped with a plurality of cameras 24 that may be used to monitor the condition of the asset protection apparatus 1, the condition of the asset, or the conditions of the environment around the asset protection apparatus 1. The monitoring means may also be connected to a network that allows for alarm or indication when any condition changes by a predetermined amount, or if the monitoring means detects that any element has been tampered with. As is known to those skilled in the art, this network could be designed for remote access through a laptop computer, personal digital assistant, mobile telephone, or other transportable device. The monitoring system may also be integrated with a local network, either automated or monitored by security personnel, so that the monitoring system alerts the relevant person or system if the monitoring system detects adverse changes to any variables that the monitoring system is configured to monitor.

Each asset protection apparatus 2 may be manufactured to the specific needs of any particular application. For example, an asset protection apparatus 2 may consist of an interior layer 7, a thermal layer 6, and an exterior layer 3. Alternatively, the asset protection apparatus 2 may consist of an interior layer 7, an inflatable layer, and an exterior layer 3. In another embodiment, the asset protection apparatus 2 may consist of an interior layer 7, an inflatable layer 5, a thermal layer 6, and an exterior layer 3. In other embodiments, the asset protection apparatus 2 may consist of multiple layers of the same type, such as having two inflatable layers 5 and two thermal layers 6. The layers may be in different orientations, depending on the embodiment. That is, in one embodiment there may be two inflatable layers 5 adjacent one another sandwiched between two thermal layers 6, with an exterior layer 3 adjacent one thermal layer 6 and an interior layer 7 adjacent the second thermal layer 6; and in another embodiment, two inflatable layers 5 may be split by a thermal layer 6, or there may be multiple thermal layers 6 and inflatable layers 5 in an alternating orientation. Accordingly, the selection of which layers are employed, the number of layers, and the orientation of the layers with respect to one another in no way limits the scope of the present invention.

It should be noted that the present invention is not limited to the specific embodiments pictured and described herein, but is intended to apply to all similar apparatuses and methods for protecting assets from damaging elements. Accordingly, modifications and alterations from the described embodiments will occur to those skilled in the art without departure from the spirit and scope of the present invention.

What is claimed is:

1. A method of protecting an asset with an asset protection apparatus during a hailstorm followed by precipitation of an accumulating substance, said method comprising:
   a. positioning said asset protection apparatus securely around the exterior of said asset, wherein an interior layer of said asset protection apparatus is adjacent said asset;
   b. inflating a first inflatable layer with a fluid, wherein said first inflatable layer is affixed to said interior layer;
   c. protecting said asset from the impact of a plurality of hailstones by allowing said fluid in said first inflatable layer to absorb the energy of the impact of said plurality of hailstones;

d. waiting for said hailstorm to dissipate;
e. allowing said accumulating substance to accumulate on said exterior layer;
f. allowing said accumulating substance to become at least semi-rigid;
g. inflating a second inflatable layer with a fluid, wherein said second inflatable layer is affixed to said first inflatable layer and said exterior layer, and wherein said second inflatable layer is sandwiched between said first inflatable layer and said exterior layer;
h. fragmenting said accumulating substance due to the change in shape of said second inflatable layer and said exterior layer during the inflation of said second inflatable layer; and
i. allowing gravity to act upon said accumulating substance so that said substance falls from said exterior layer.

2. The method according to claim 1 wherein said asset protection apparatus is further defined as being designed to cover the exterior of an aircraft.

3. The method according to claim 1 wherein said asset protection apparatus further comprises a thermal layer, wherein said thermal layer is positioned between said interior layer and said first inflatable layer.

4. The method according to claim 1 wherein said first inflatable layer is further defined as being comprised of a plurality of modules in fluid communication with one another.

5. The method according to claim 1 wherein said second inflatable layer is further defined as being comprised of a plurality of modules in fluid communication with one another.

6. The method according to claim 1 wherein said substance is further defined as ice.

7. The method according to claim 1 wherein said substance is further defined as snow.

8. The method according to claim 1 wherein said exterior layer is further defined as being constructed of a flexible material that prevents radiation intrusion to said asset surface, and wherein said exterior layer is constructed of a material or materials that alone or in combination provide resistance to water, environmental pollutants, industrial pollutants, UV rays, electromagnetic waves, and abrasion.

* * * * *